Dec. 20, 1955     F. NASELLI     2,727,316
CONTINUOUS COFFEE ROASTER AND DRYER
Filed Sept. 6, 1952     4 Sheets-Sheet 1
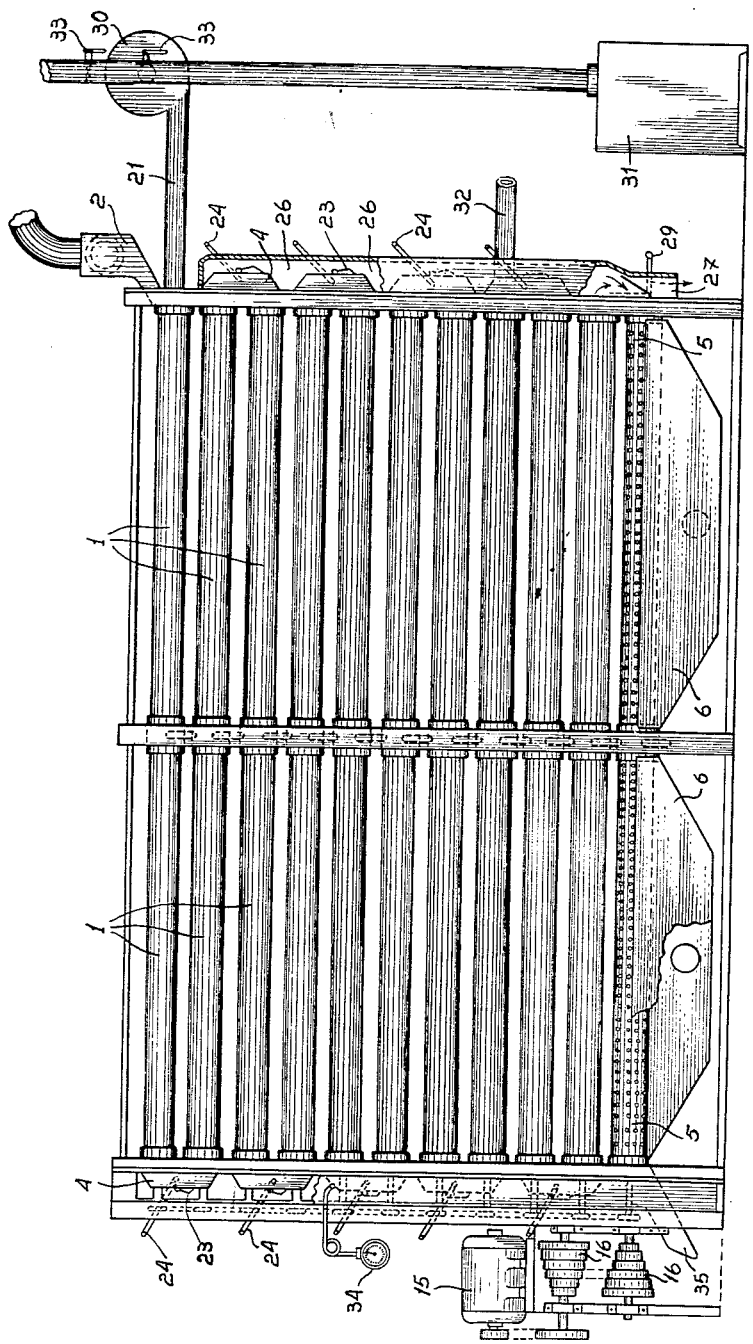
INVENTOR:
FELIPPE NASELLI
BY
Karl F. Ross
AGENT Dec. 20, 1955 F. NASELLI 2,727,316
CONTINUOUS COFFEE ROASTER AND DRYER
Filed Sept. 6, 1952 4 Sheets-Sheet 2
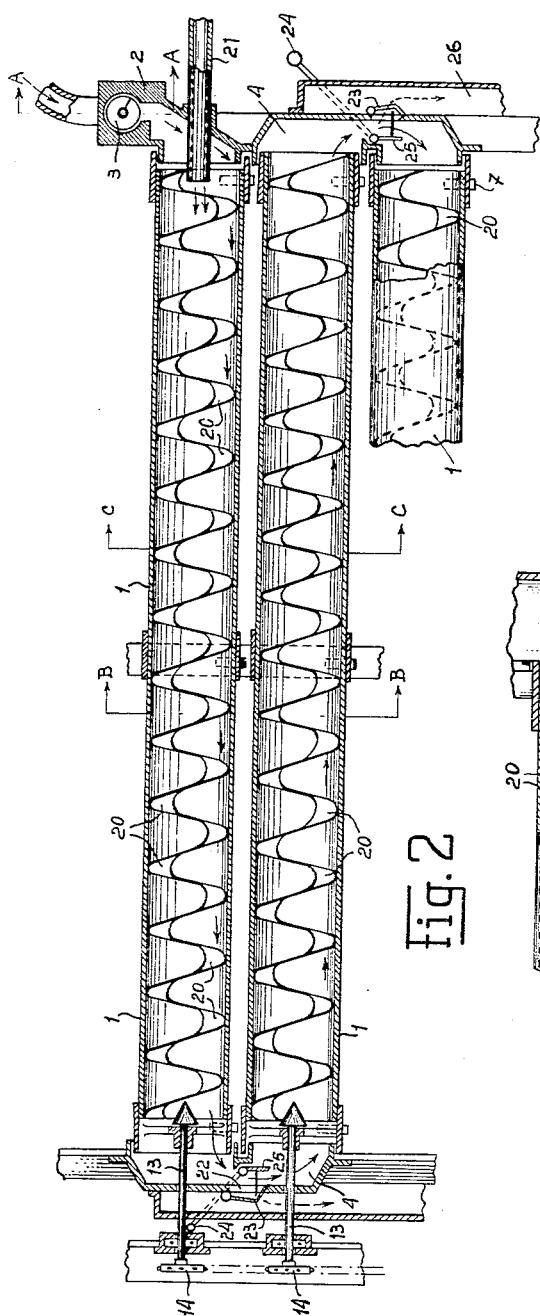
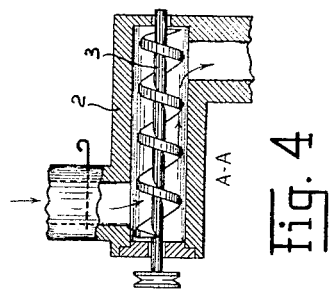
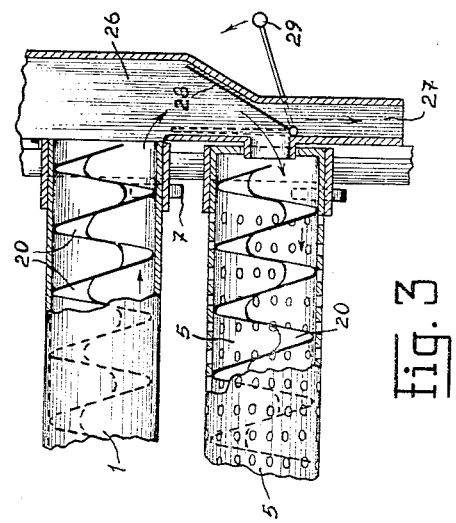
INVENTOR:
FELIPPE NASELLI
BY
Karl F. Ross
AGENT Dec. 20, 1955  F. NASELLI  2,727,316
CONTINUOUS COFFEE ROASTER AND DRYER
Filed Sept. 6, 1952  4 Sheets-Sheet 3

INVENTOR:
FELIPPE NASELLI
BY
Karl F. Ross
AGENT

Dec. 20, 1955   F. NASELLI   2,727,316
CONTINUOUS COFFEE ROASTER AND DRYER
Filed Sept. 6, 1952   4 Sheets-Sheet 4
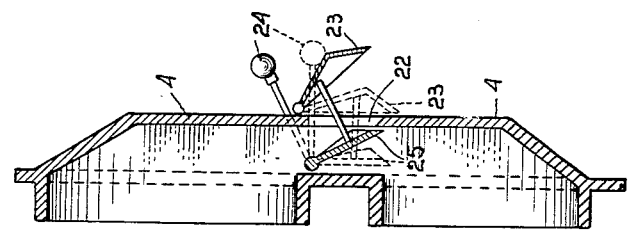
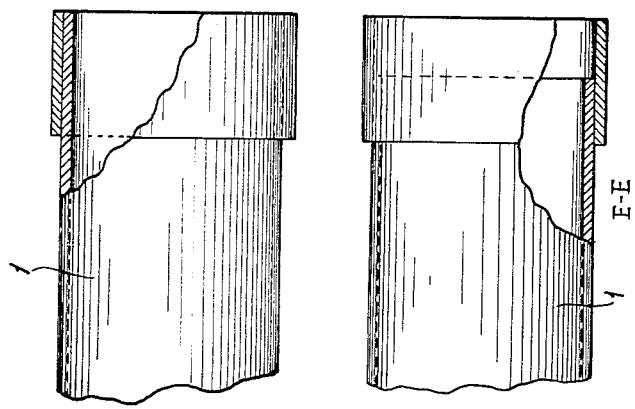
Fig. 10
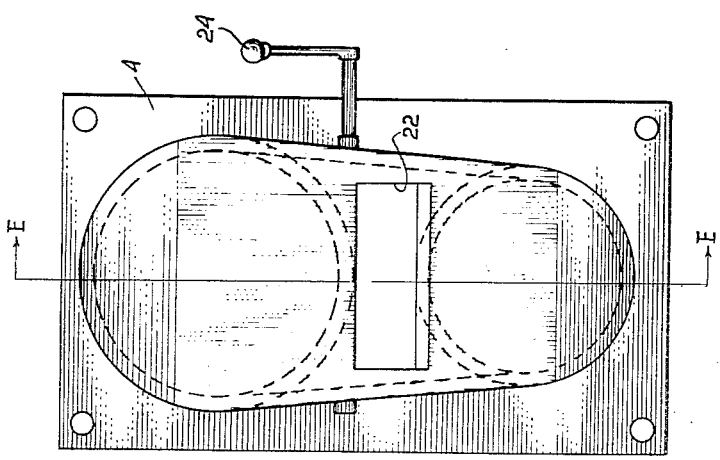
Fig. 9
INVENTOR:
FELIPPE NASELLI
BY
Karl F. Ross
AGENT

United States Patent Office 2,727,316
Patented Dec. 20, 1955

2,727,316
CONTINUOUS COFFEE ROASTER AND DRYER
Felippe Naselli, Sao Paulo, Brazil Application September 6, 1952, Serial No. 308,241

Claims priority, application Brazil September 12, 1951

2 Claims. (Cl. 34—129)

The present invention relates to a new continuous coffee roaster and dryer, very practical and effective and of a simple and low cost construction.

The new roaster and dryer essentially comprises a plurality of superposed parallel horizontal pipes, which ends are connected to each other in pairs by means of passage heads, one end of the upper pipe being connected with a hopper provided with a conveyor. The pipes are provided, at the same end, with a shaft on which a gear wheel is mounted, driven by an ingenious chain device which causes the pipes to rotate in alternately opposite senses.

The pipes are internally provided with a helicoidal surface so disposed that a central longitudinal channel is formed, into which hot air is blown.

The roasting of the coffee can be checked and the coffee already roasted can be withdrawn from the apparatus during the operation, through openings and suitable devices which are provided in the above cited heads.

Figure 8:
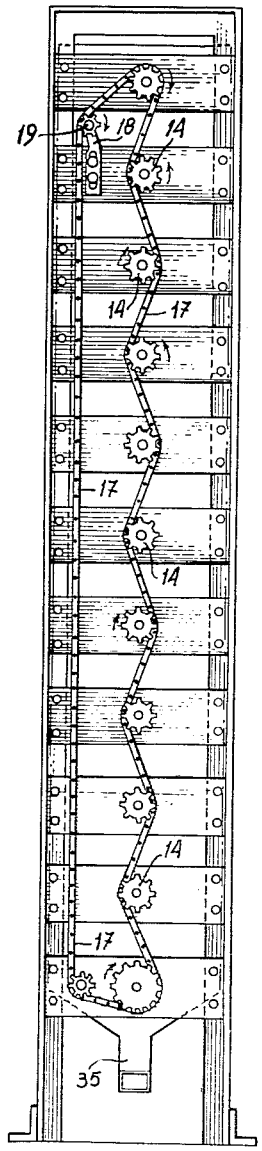
Figure 5:
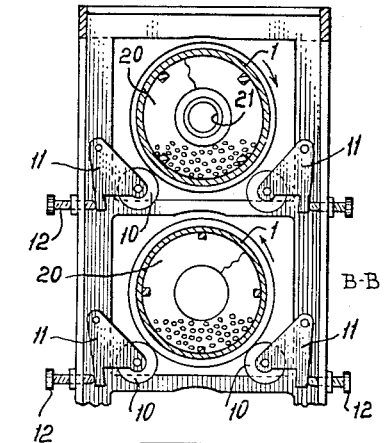
Figure 6:
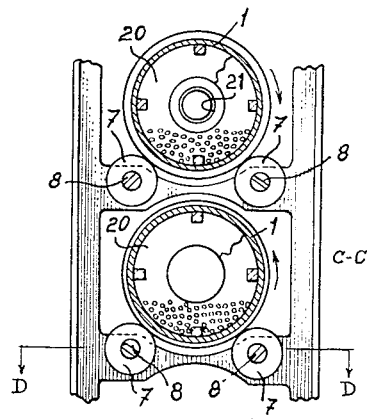
Figure 7:
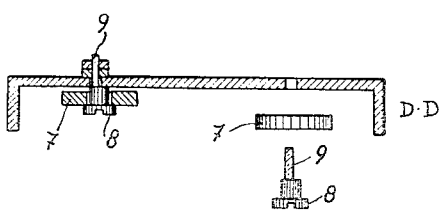

A preferable feature of the invention is represented, as nonlimiting example, in the enclosed drawings, wherein:

Sheet 1, Figure 1 is a side view of the machine;

Sheet 2, Figure 2 is a vertical section of the upper part of the machine; Figure 3 is a section and detail of the two lower pipes of the machine; Figure 4 is the section A—A;

Sheet 3, Figure 5 is the section B—B; Figure 6 is the section C—C; Figure 7 is the section D—D; Figure 8 is a view of the pipes driving assembly;

Sheet 4, Figure 9 is a front view of the connecting head of two pipes; and Figure 10 is the section E—E.

The new roaster and dryer comprises a plurality of superposed, parallel horizontal tubes 1, suitably sustained. One end of the upper tube is connected to a hopper 2 provided with a screw conveyor 3, by which the beans are uniformly fed and any obstruction is prevented.

The other end of the upper pipe is connected to the corresponding end of the following one by means of a passage head 4, and the remaining pipes are subsequently joined to each other by means of identical passage heads, thus forming a continuous passage from the first pipe to the last one.

The last pipe 5 has perforated walls and is partially enclosed by walls 6 which are connected to suitable exhausters.

The ends of the pipes are supported by two rolls 7 maintained in position by means of screws 8 with cam pins 9 for the necessary adjustment. The pipes are centrally supported by rolls 10 which can rotate on shafts bearing on a triangular bracket 11, eccentrically mounted on the frame of the machine. The position of this bracket being adjustable by means of the screws 12.

The pipes are provided at one of their ends with shafts 13 provided with gear wheel 14; a driving assembly comprising a motor 15 and two step pulleys 16 is provided. The movement is transmitted by chain 17 which engages the gear wheels, so as to cause the pipes to rotate in alternately opposite senses; the chain tension is adjusted by means of a member 18 of adjustable position and provided with gear wheel 19.

The pipes are internally provided with a helicoidal surface 20 so disposed that a central longitudinal channel is formed. Said helicoidal surface has the same sense in the various pipes, but, being opposite the sense of rotation of adjacent tubes, the beans will move continuously.

The end of the upper pipe where the hopper 2 is attached, is also provided with a pipe 21 through which hot air can be supplied.

The heads are provided with side windows 22 that may be closed from the outside by means of curved plates 23 controlled by handles 24; the same handles control also inner plates 25 which, when the windows are closed, allow the passage of the beans to the following pipe, and, when the windows are open, form inclined planes by which the beans can pass through the windows to a continuous vertical lateral pipe 26, provided with discharge chute 27. Just over said chute, there is a blade 28 controlled by means of handle 29, by means of which the beans may be fed to the lower tube 5 or discharged through chute 27.

The hot air blown by means of the blower 30 from the generator 31, is discharged by means of tube 32 disposed at an intermediate position.

Valves 33 for adjusting the hot air supply are provided, as well as a pyrometer 34 for the control of temperature.

Wherever necessary the movable parts are provided with roller bearings, bushes and pins for suitable lubrication.

The machine operates as follows: the coffee beans are fed through hopper 2, and at the same time the motor 15 and the generator 31 are operated, in order to rotate the pipes 1 and to blow hot air. The beans are conveyed into the upper pipe and pass to the next pipe which rotates in opposite sense, and so on.

Depending upon the state of the beans, these can be, or not, withdrawn from the machine without passing through all pipes.

In order to check the roasting of the coffee at any moment, it is sufficient to operate lever 24, removing the beans to the side tube 26 and collecting them in chute 27; for this purpose, the lower blade 28 should be in vertical position. If the beans are sufficiently roasted, chute 27 is closed by means of blade 28, maintaining window 22 open, whereupon the beans will pass directly to the perforated tube 5 where they come into contact with the air, which is moved by the exhausters connected to the walls 6; the cooled beans are then withdrawn through chute 35.

In this way it is possible to obtain the coffee beans roasted in the most perfect manner because the roasting state can be checked at any moment.

It is clear from the above description that the machine has very large output. At the same time, its cost is very low, and to the roasting coffee plant represents an enormous economical interest.

Due to the fact that the hot air is circulated successively through the various pipes and therefore put into good use, a big economy of fuel is obtained.

It is evident that the described machine may also be used for drying other products.

Having thus described the invention, what I claim is:

1. In a coffee roasting machine, in combination, a plurality of superposed, substantially horizontal pipes each provided internally with a helicoidal thread, said thread extending along the inner periphery of the respective pipe but leaving a central clearance defining an axial channel within each of said pipes, mechanism for rotating alternate ones of said pipes in opposite directions, each of said pipes having an inlet end and an outlet end, conduit means connecting the outlet end of each upper pipe with the inlet end of the next lower pipe, hopper means at the uppermost one of said pipes for supplying coffee beans to the inlet end thereof, rotation of said pipes thereupon causing entrainment of said beans by said helicoidal threads through all of said pipes and through said conduit means to the lowermost one of said pipes, a tube traversing said hopper means and extending axially into the channel of said uppermost pipe, and a source of hot air including blower means connected to said tube for forcing said air successively through all of said pipes by way of said axial channels and said conduit means.

2. In a coffee roasting machine, in combination, a plurality of superposed, substantially horizontal pipes, conduit means interconnecting successive ones of said pipes at their ends, said conduit means comprising a set of superposed headers, mechanism for passing coffee beans successively through all of said pipes from the uppermost to the lowermost one thereof, and a substantially vertical chamber enclosing said headers and having an opening at its bottom, said headers being provided with windows opening into said chamber and with shutter means for closing said windows, whereby beans from different ones of said pipes may be routed directly to said opening.

References Cited in the file of this patent

UNITED STATES PATENTS

| | | |
|---|---|---|
| 360,971 | Palmer et al. | Apr. 12, 1887 |
| 635,158 | Sutherland | Oct. 17, 1899 |
| 813,274 | Boof | Feb. 20, 1906 |
| 1,012,293 | Talbutt | Dec. 19, 1911 |
| 1,276,957 | Reed | Aug. 27, 1918 |
| 1,439,317 | Maede | Dec. 19, 1922 |
| 1,793,009 | Phillips et al. | Feb. 17, 1931 |
| 1,820,938 | Clandrow | Sept. 1, 1931 |
| 1,994,083 | Brown et al. | Mar. 12, 1935 |